2,699,401
Patented Jan. 11, 1955

2,699,401

TEXTURE PAINT

Frank X. Grossi, St. Louis, Mo., assignor to The Reardon Company, St. Louis, Mo., a corporation of Missouri No Drawing. Application November 17, 1949, Serial No. 128,017

6 Claims. (Cl. 106—193)

This invention relates generally to paint, and particularly to texture paint of the character wherein water is utilized as the vehicle.

So-called texture paints are characterized by the feature that, when applied to a wall or other surface by a technique with which skilled painters are familiar, a stippled or wavy surface results. In the manufacture of texture paints, it is customary to incorporate substantial quantities of coarse materials, such as mica, asbestos fibers, or gypsum plaster, which have a bodying effect and impart to the paint film the wavy characteristic. Heretofore it has been customary, in those texture paints which are incorporated with water as a vehicle, to utilize casein or glue as the binding agent. In some instances, the casein or glue binder has been partially replaced by starch, but inevitably such partial substitution has reduced the covering power of the resultant paint and been detrimental to the adhesive properties of the paint. While, from the standpoint of cost, it would appear to be desirable to utilize starch in total substitution for casein and glue binders as heretofore employed, the experience of those skilled in the art has been that, upon drying of the applied paint film, blushing occurs, producing a mottled color effect and, furthermore, the brushing properties, covering power and adhesion of such paints, utilizing starch alone as the binder, are far inferior to those which have heretofore been accomplishable with other binders, such as casein and glue. Moreover, starch does not yield a paint which retains the desired stippled or wavy effect of a texture paint, but, on the contrary, has considerable tendency to sag or level.

The object of the present invention, generally stated, is to provide a cold water texture paint having increased covering power, but which is retentive of its waves and stipples.

Another object of the present invention is to replace the usual casein or glue binder in a texture paint with starch without, however, sacrificing desirable characteristics of the paint.

Other objects will become apparent to those skilled in the art when the following description is read:

The present invention contemplates a texture paint which may be compounded and marketed in dry powder form, to be mixed with water just prior to application, such texture paint in the dry powder form containing on the order of 40% by weight of bodying materials, such as mica, asbestos fibers, or gypsum plaster. The usual pigments and fillers are also present. The invention is particularly concerned with the binding components of such a texture paint and contemplates a binder composed of starch and a water-soluble cellulose ether.

Among the water-soluble cellulose ethers contemplated by the invention and available commercially are: sodium carboxy methyl cellulose, the methyl ether of cellulose, and hydroxy ethyl cellulose. These are available commercially as dry powders suitable for incorporation with other solids in the dry composition. The first two of the above-mentioned cellulose ethers are available commercially at various viscosities, but the present invention contemplates particularly those which have a viscosity of less than 100 centipoises in 2% water solution at 25° C. The present invention does not preclude the possibility of using some of materials having a higher viscosity than 100 centipoises, provided there is concurrently used enough of lower viscosity materials to reduce the mean viscosity to below 100 centipoises.

As an example of one suitable composition, the following formula may be followed, the proportions being indicated in parts by weight:

| | Parts |
|---|---|
| Mica (100% through 80 mesh) | 20 |
| Asbestos fibers | 15 |
| Gypsum plaster | 10 |
| Whiting | 15 |
| Lithopone | 15 |
| China clay | 16 |
| Starch | 5 |
| Sodium carboxy methyl cellulose (viscosity of 2% water solution at 25° C. 20–70 centipoises) | 3½ |
| Sodium pentachlorophenate | 2 |

The sodium pentachlorophenate is a preservative for the starch and the sodium carboxy methyl cellulose. The starch may be any of the various starches available on the market, gelatinized corn starch being ideal for the purpose. The several ingredients are mixed together in dry condition so as to uniformly distribute the several components in a manner well known in the paint art.

As another example, the following formula may be followed:

| | Parts |
|---|---|
| Mica (100% through 80 mesh) | 20 |
| Asbestos fibers | 12 |
| Gypsum plaster | 10 |
| Whiting | 15 |
| Lithopone | 15 |
| China clay | 16 |
| Starch | 4 |
| Sodium carboxy methyl cellulose (viscosity of 2% water solution at 25° C. 20–70 centipoises) | 3 |
| Sodium carboxy methyl cellulose (viscosity of 2% of material in 6% NaOH solution 70–150 centipoises at 25° C.) | 3 |
| Sodium pentachlorophenate | 2 |

The second-mentioned carboxy methyl cellulose indicated in the foregoing formula is substantially insoluble in water, but is soluble in a 6% solution of sodium hydroxide and is herein referred to as alkali-soluble sodium carboxy methyl cellulose, as distinguished from the water-soluble variety also included in both of the formulae above given. The presence of the alkali-soluble sodium carboxy methyl cellulose enables a reduction in the content of both the bodying materials and the starch.

A further example is set forth in the following formula:

| | Parts |
|---|---|
| Mica (100% through 50 mesh) | 20 |
| Asbestos fibers | 10 |
| Gypsum plaster | 10 |
| Whiting | 14 |
| Lithopone | 15 |
| China clay | 16 |
| Starch | 5 |
| Sodium carboxy methyl cellulose (viscosity of 2% water solution at 25° C. 20–70 centipoises) | 4 |
| Sodium carboxy methyl cellulose (viscosity of 2% of material in 6% NaOH solution 70–150 centipoises at 25° C.) | 4 |
| Sodium pentachlorophenate | 2 |

A still further example is as follows:

| | Parts |
|---|---|
| Mica (100% through 80 mesh) | 20 |
| Asbestos fibers | 12 |
| Whiting | 14 |
| Lithopone | 15 |
| Gypsum plaster | 10 |
| China clay | 17 |
| Gelatinized corn starch | 4 |
| Sodium carboxy methyl cellulose (viscosity of 2% water solution at 25° C. 20–70 centipoises) | 3 |
| Sodium carboxy methyl cellulose (viscosity of 2% of material in 6% NaOH solution 30–70 centipoises at 25° C.) | 3 |
| Sodium pentachlorophenate | 2 |

A still further example is as follows:

| | Parts |
|---|---|
| Mica, asbestos fibers and/or gypsum plaster | 40–46 |
| Lithopone | 15 |
| Whiting and/or china clay | 30–31 |
| Starch | 4–5 |
| Water-soluble sodium carboxy methyl cellulose, methyl ether of cellulose and/or hydroxy ethyl cellulose | 3–4 |

The sodium carboxy methyl cellulose compounds mentioned in all of the foregoing formulae may be of the technical grade obtainable upon the market, provided they have a purity of at least 60%. The water-soluble low-viscosity type is a free-flowing powder having a density of 0.6 to 0.8. The alkali-soluble type of sodium carboxy methyl cellulose is a fibrous product having a density of between 0.2 and 0.4. In each of the aforesaid formulations, the methyl ether of cellulose (available on the market under the name of "Methocel"), which is water-soluble and of the grade having a viscosity of between 15 and 100 centipoises, may replace, part for part, the water-soluble sodium carboxy methyl cellulose ingredient. Likewise, hydroxy ethyl cellulose (which, as now available commercially, has the viscosity range above given) may likewise be substituted, part for part, in place of the carboxy methyl cellulose.

Texture paints compounded in accordance with the present invention, as typified by the foregoing formulae, have been found to have a covering power amounting to 133% of the covering power of comparable casein-bound texture paints, and amounting to 140% of the covering power of comparable glue-bound texture paints. Moreover, the brushing characteristics, retentiveness of stipple, adhesion, and resistance to cracking are all markedly superior to casein-bound and glue-bound texture paints, as heretofore known.

Moreover, the texture paints of the present invention, characterized by the use of starch and the cellulose ether as bonding agents, have the desired advantage over casein- and glue-bound texture paints in that the incorporation with water immediately prior to the time of application may be accomplished with such facility and speed, and further that the resultant water suspension of pigment, filler, bodying agents, and bonding agents is uniform and stable.

While five specific examples of compositions illustrating the invention have been hereinbefore disclosed, it is not to be understood that the invention is limited to the particular materials mentioned or to the specific proportions indicated. On the contrary, such variations may be made therein as may occur to those skilled in the art, in adapting the texture paints for particular uses, without departing from the spirit of the invention or the scope of the appended claims.

Having thus described the invention, what is claimed and desired to be secured by Letters Patent is:

1. A composition of matter consisting essentially of:

| | Parts |
|---|---|
| A bodying material selected from a group consisting of mica, asbestos fibers and gypsum plaster | 40–46 |
| Lithopone | 15 |
| A filler selected from a group consisting of whiting and china clay | 30–31 |
| Starch | 4–5 |
| Water-soluble cellulose ether selected from a group consisting of sodium carboxy methyl cellulose, methyl ether of cellulose and hydroxy ethyl cellulose | 3–4 |

2. The dry composition of claim 1 characterized by the addition of 3–4 parts of sodium carboxy methyl cellulose which is substantially insoluble in water but which is soluble in 6% alkali solution.

3. Texture paint containing a major proportion of bodying materials, pigment and filler, and a minor proportion of binder consisting essentially of starch and water-soluble cellulose ether.

4. Texture paint containing a major proportion of bodying materials, pigment and filler, and a minor proportion of binder consisting essentially of starch and a water-soluble cellulose ether selected from the group consisting of sodium carboxy methyl cellulose, methyl ether of cellulose, and hydroxy ethyl cellulose.

5. Texture paint containing a major proportion of bodying materials, pigment and filler, and a minor proportion of binder consisting essentially of starch and water-soluble cellulose ether, said water-soluble cellulose ether, when in solution in the proportion of two parts by weight to 98 parts of water, having a viscosity of less than 100 centipoises at 25° C.

6. Texture paint containing a major proportion of bodying materials, pigment and filler, and a minor proportion of binder consisting essentially of starch, water-soluble cellulose ether, and carboxy methyl cellulose which is substantially insoluble in water but is soluble in 6% alkali solutions.

References Cited in the file of this patent

UNITED STATES PATENTS

| Number | Name | Date |
|---|---|---|
| 2,180,152 | Kohler | Nov. 14, 1939 |
| 2,362,761 | Medl | Nov. 14, 1944 |
| 2,433,833 | Auer | Jan. 6, 1948 |

FOREIGN PATENTS

| Number | Country | Date |
|---|---|---|
| 529,993 | Great Britain | Dec. 3, 1940 |

OTHER REFERENCES

"Hercules CMC," Hercules Powder Co. Cellulose Products Dept., Wilmington, Delaware, 1949, pages 1–8.

Ott: "High Polymers," vol. V, 1943, pages 784–787.